United States Patent [19]
Schipke et al.

[11] 3,831,450
[45] Aug. 27, 1974

[54] AGRICULTURAL ALARM SYSTEM TO WARN OF IMPENDING AGRICULTURAL PEST ATTACKS

[75] Inventors: Winfried Schipke; Friedrich Scharf, both of Stuttgart, Germany

[73] Assignee: Robert Bosch GmbH, Gerlingen-Schillerhoke, Germany

[22] Filed: Feb. 28, 1973

[21] Appl. No.: 336,824

[30] Foreign Application Priority Data
Apr. 17, 1972 Germany............................ 2218452

[52] U.S. Cl..................................... 73/336, 73/344
[51] Int. Cl.............................................. G01w 1/06
[58] Field of Search......... 73/336, 344, 73, 389, 29, 73/64.2, 339 R, 336.5; 340/347 AD

[56] References Cited
UNITED STATES PATENTS
3,360,722  12/1967  Von Bethman....................... 73/336

Primary Examiner—Richard C. Queisser
Assistant Examiner—Denis E. Corr
Attorney, Agent, or Firm—Flynn & Frishauf

[57] ABSTRACT

To warn farmers when conditions are favorable for fungus infection, that is, certain humidity and temperature conditions which have presisted for predetermined periods of time, a humidity sensing device senses humidity of the atmosphere in the region of the agricultural planting to provide a humidity sensing signal; a temperature sensing means senses temperature of the atmosphere and provides a temperature sensing signal; the signals are converted into digital form, or integrated over time, and a threshold circuit is provided which, when a certain time-integral of humidity or temperature, during predetermined conditions of other sensed condition (temperature or humidity) is determined, an alarm signal is given. If the signal is a digital signal, a counter is activated to count the digits above a threshold level of humidity, and giving an alarm signal when a certain time during which both temperature and humidity were at levels at which pests proliferate, is exceeded.

26 Claims, 2 Drawing Figures

AGRICULTURAL ALARM SYSTEM TO WARN OF IMPENDING AGRICULTURAL PEST ATTACKS

The present invention relates to an agricultural alarm system and more particularly to a system to indicate when conditions favorable to attack by pests, specifically fungus infection, occur, and persist for predetermined periods of time.

Spores of scaly fungus live over winter, particularly in rotting leaves, depressions of fallen leaves and the like. In spring, the first generation of spores, the gametes of the fungi are developed; they particularly proliferate when certain humidity conditions are present, for example dampness of the leaves, causing the first fungus infection on the young leaves. For a discussion of the growth process, reference may be had to "Garden Encyclopedia" and "Scientific Encyclopedia", published by D. Van Nostrand Company, Inc., New York, N.Y., under ascomycetes and fungi, and cross referenced entries. The spores of further fungus generations, hereinafter merely called "spores" germinate at certain leaf humidity conditions and temperatures above + 5.5 C°, after some time. The time lapse after which the spores begin to germinate depends on temperature. If the humidity decreases below a certain level, germinating spores are killed upon presence of dry air and sunshine in about four hours. If the weather is foggy, or drizzly, however, or during the night, or under high humidity conditions, the spores can weather the interruption of dampness of the leaves for about 8–12 hours, and even more. The time after germination of the spores until penetration into the leaves is about 12 hours. This is the time within which the fungus infection should be fought. Once the spores have settled within the leaf, that is, when they have penetrated the leaf surface or skin, it is no longer possible to successfully attack the fungus infection. New fungi will form, which again generate spores which are ejected.

When protecting plants against fungus infection, it is necessary to consider the above sequence of events, during infection; fungus infection is a dangerous pest for many fruit farms and the specification will be particularly directed to protection of orchards, particularly apple orchards. If a fruit tree cannot be freed of fungus infection, then the spores will be distributed on fruit, for example on the apples, with dripping water, where the really undesired fungus webs are formed. The fungus webs are undesired on fruit, particularly on apples, since they detract from the appearance of the apples, interfere with storage and shipping of fruit, and cause premature drying and desiccation of fruit. Damage due to fungus infection can be avoided only if fungicides are sprayed at a suitable time, to attack the scaly fungus. Such fungicides are more or less poisonous and, unless the time for spraying is accurately selected, rather than taken at random, excessive amounts of agricultural poison are distributed and sprayed on the trees.

It is an object of the present invention to provide a warning system to be used within an overall integrated agricultural warning system so that spraying, particularly in orchards, can be done selectively, and effectively with minimum application of poisonous compounds. Integrated plant protection means determination of the proper instant of time when sprays should be used, so that the biological balance of the environment is upset as little as possible. The sprays which are used are invariably environmentally poisonous and thus the environmental equilibrium, or ecological balance should be disturbed as little as possible. Additionally, using less sprays, apart from the decrease in ecological damage, decreases costs for materials and labor during application. It is therefore an additional object of the present invention to provide a warning system which accurately determines the time at which sprays are most effective, or should be carried out. The then customary preventive sprays, which may not be effective and which have been carried out more or less at random, can then be omitted.

SUBJECT MATTER OF THE PRESENT INVENTION

Briefly, the warning system includes the combination of a temperature sensing device and a humidity sensing device, and apparatus, preferably operating on the analog-digital conversion principle, and providing an output, preferably coupled to an automatic alarm, which responds if a time-temperature integral, above a predetermined humidity, is exceeded; if the apparatus operates digitally, a counter is preferably used which, when the count reaches a predetermined number, responds and initiates an alarm.

The invention will be described by way of example with reference to the accompanying drawings, wherein.

Figure 1:
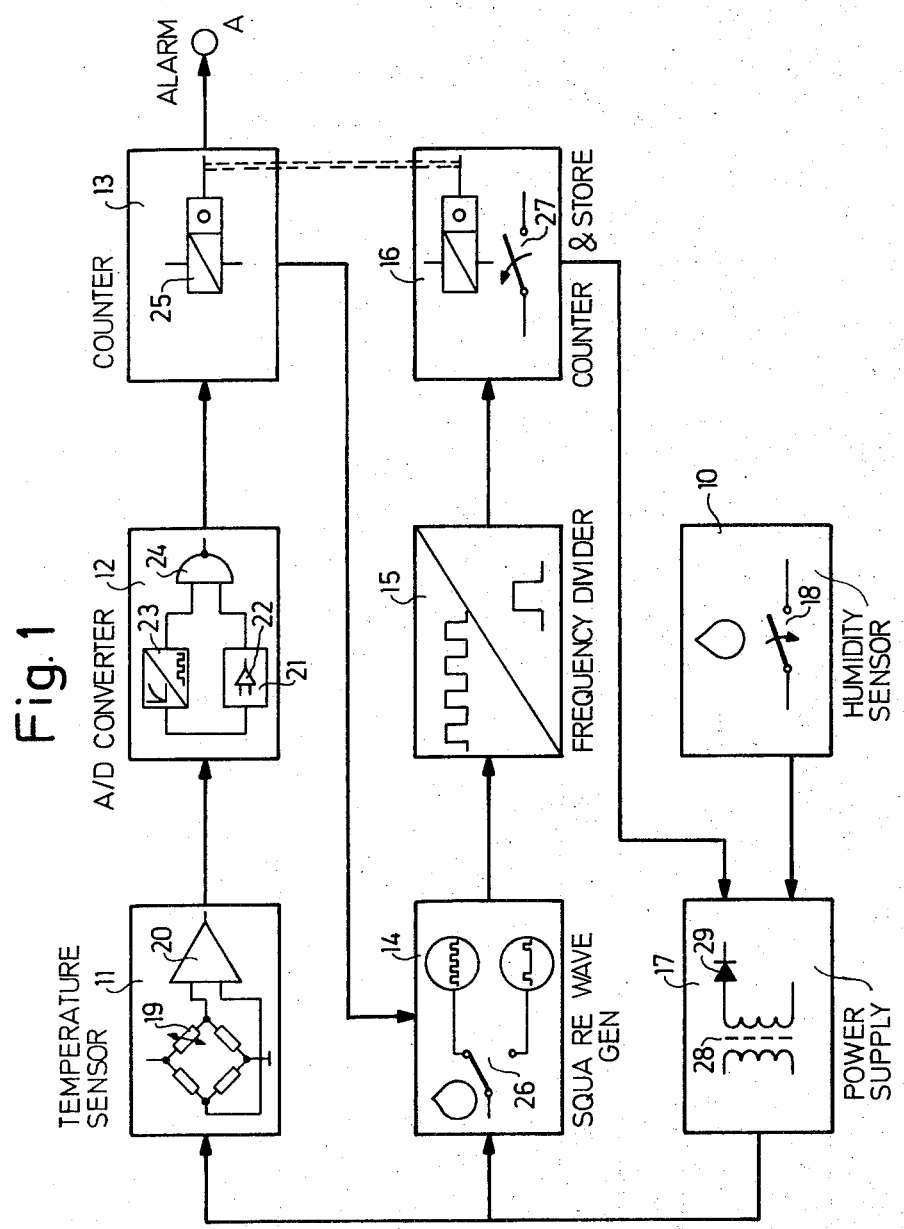
FIG. 1 is a generally schematic circuit diagram of the warning system.
Figure 2:
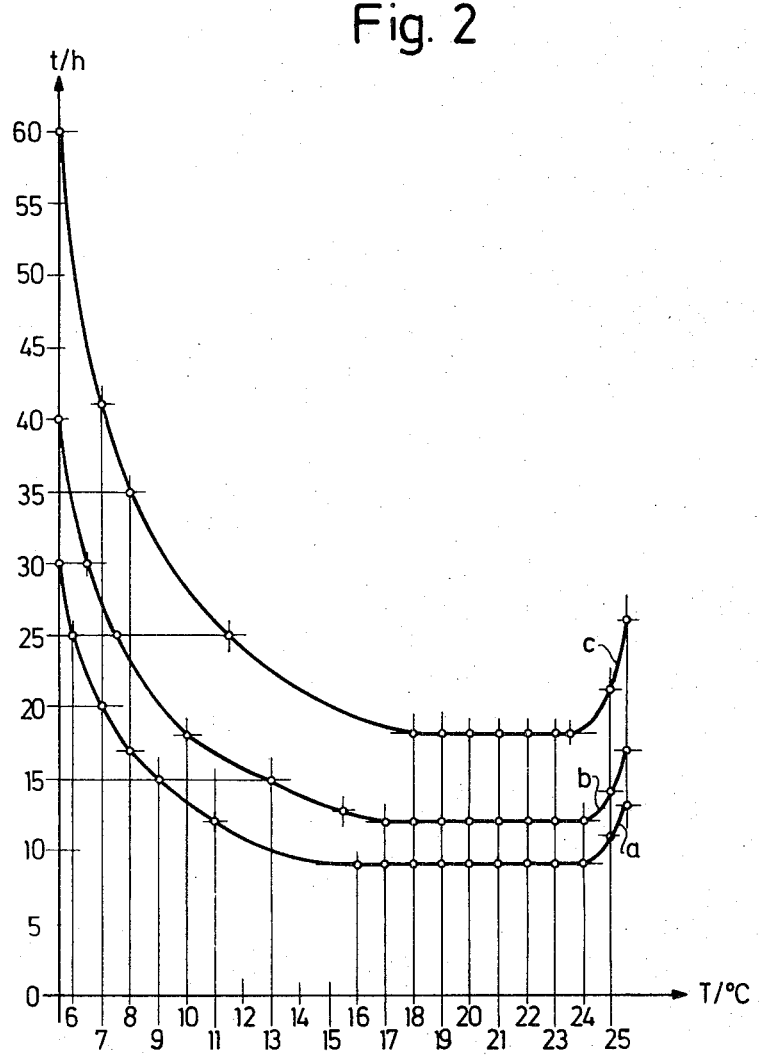
FIG. 2 illustrates a family of curves, illustrating the dependence of fungus infection on time and air temperature.

The curves illustrated in FIG. 2 were derived by W. D. Mills, of Great Britain. The degree of infection is illustrated by the three different curves, curve $a$ being a light infection, curve $b$ an average infection, and curve $c$ a heavy infection by scaly fungus. The apparatus, the principle of which is illustrated in FIG. 1, utilizes the data derived by Mr. Mills, to provide output pulses to trigger an alarm, if conditions above certain humidity threshold levels occur at the temperatures and times, which would result in the infections as illustrated in the diagrams of FIG. 2.

The apparatus of FIG. 1 comprises a humidity sensing element 10 to measure leaf moisture or humidity; a temperature sensing element 11, an analog-digital (A/D) converter 12 and a counter 13, which is connected to an alarm device schematically indicated at A. Alarm device A responds after counter 13 has reached a certain count.

The apparatus illustrated in the embodiment of FIG. 1 further includes a square wave generator 14, a frequency divider 15, a second counter 16 to determine the end of a previous count cycle and the start of a new count cycle, and a power supply 17.

In detail: The units 11–17 are located as a protected main apparatus, and a remote sensing device which primarily includes humidity sensor 10. The humidity sensor 10 is located, for example, in the orchard and connected to the main device by means of a multi-conductor cable. In one form, the humidity sensor 10 has a frame on which a filament is stretched which changes dimension, for example contracts, in the presence of humidity, and thus closes contact 18. Contact 18 may, for example, be a microswitch with a waterproof housing, the frame with the humidity sensing filament being located on the top surface or roof of the housing. Various other types of humidity sensors may be used, and it is also possible to include the temperature sensing device 11 and an ambient humidity sensor 26, to control generator 14, as will appear below.

Temperature sensor 11 in its simplest form is a resistance bridge circuit which includes a negative temperature coefficient (NTC) resistor 19, connected to the input of a voltage amplifier 20. Upon change in temperature, the input voltage to the amplifier changes. Amplifier 20 is an operational amplifier, in a feedback circuit, and amplifies the output voltage from the temperature sensing bridge.

A/D converter 12 includes a threshold circuit 21 which has an operational amplifier 22 as a threshold responsive switch, and a voltage-frequency converter 23, as well as a NAND-circuit 24. The operational amplifier can be so connected that, if the input to one terminal, for example the inverting terminal passes a level set by a voltage divider, the tap point of which is connected to the other terminal (then the non-inverting terminal), the output will be derived from the operational amplifier. The operational amplifier 22 forming the active element of threshold switch 21 evaluates the output voltage of the amplifier 20 connected in the temperature sensor 11. The threshold circuit 21 inhibits counting by the counter when the temperature falls below 5.5° C. Below this temperature, scaly fungus will not develop. Counting is inhibited by blocking the NAND-circuit 24. The output voltage of amplifier 20 of the temperature sensor 11 also forms the input to the voltage-frequency converter 23, which provides output pulses to the NAND-circuit 24. NAND-circuit 24, as has been described, is blocked when the temperature is below 5.5° C. The output voltage of the threshold switch 21 becomes zero at an ambient temperature $T \leq +5.5°C$.

The output pulses from the NAND-gate 24 are summed in a counting relay 25 of counter 13. Counting relay 25 is an adding counter having an electrical and mechanical zero reset. The pulse count which corresponds to the infection threshold of scaly fungus can be set in a count number visible in a window of counting relay 25, or otherwise predetermined. When the predetermined pulse number is reached, a transfer switch in counter 13 provides an alarm output to alarm circuit A. After an alarm output has been given, the summed value cannot be erased anymore, as will be described in detail below. It can be reset only by hand.

A timing chain including circuits 14, 15 and 16 is particularly desirable in the warning system. The timing chain is used to keep the apparatus operative after dampness of the leaves has ceased, for times between 4 and 12 hours, depending on ambient humidity. Four hours would be selected for dry surrounding air, 12 hours for ambient high humidity. After this time lapse, the timing chain provides an output pulse which disconnects the apparatus and resets the counting relay 25 to the initial output value.

After the count in counter 13 has been terminated, that is, after leaf dampness has ceased, the leaf dampness sensor 10 will open, that is, will disconnect. This switching change causes connection, or start of the square wave pulse generator 14. Pulse generator 14 is a high accuracy pulse generator which provides pulse periods which have a rate depending on ambient humidity. For example, when the air is dry, the pulse period is 1.8 seconds; when the air is highly humid, the pulse period will be 5.4 seconds. In dry air, a turn-off duration of 4 hours is obtained, in damp air, a turn-off duration of 12 hours. The change-over from 1.8 to 5.4 seconds, and reverse, is obtained by a contact hygrometer 26. Other systems may be used.

The output pulses of the pulse generator 14 are connected to a frequency divider 15 which provides an output pulse after $0.8 \times 10^4$ input pulses, and which resets the counting relay 25 to zero, and disconnects the warning apparatus. A pulse period of 1.8 seconds provides a duration of $1.8 \times 0.8 \times 10^4 = 4$ hours; a pulse period of 5.4 seconds provides $5.4 \times 0.8 \times 10^4 = 12$, so that, after the leaf dampness has ceased, 4 or 12 hours will be required before the warning system is reset. Within this span of from 4 to 12 hours, the count of chain 11, 12, 13 can be resumed as often as humidity is sensed by sensor 10, and excess temperature conditions by sensor 11, and the count can be summed in counter 13. Reset of counter 13 is schematically indicated by the dashed lines between relays 16 and 25. Counters 13 and 16 can be combined in a single apparatus or housing. The element 16 includes the reset winding and the main switch for the power supply for the entire system. Operating voltage for the electronic components are stabilized in a precision power supply 17 including, for example, a transformer 28 and a diode 29; a bridge rectifier; or various types of stabilized voltage supplies.

The warning system has been described in connection with warning for conditions suitable for the formation of scaly fungus. It is essentially an electronic instrument which can be used to protect agricultural plantings, particularly orchard trees, against scaly fungus. It senses ambient conditions under which scaly fungus are particularly dangerous and provides a warning system for the most suitable timing to initiate spraying against scaly fungus. Merely preventive sprays, as are frequently practised, can be omitted, which substantially reduces costs in orchard operations and further reduces danger of ecological damage by proliferation and spreading of poisenous agricultural preventive substances and fungicides.

The warning system essentially includes a temperature sensor and summing device which, in principle, is a temperature sensing device, a voltage-frequency converter (that is, a voltage controlled pulse source) and a counter. It is enabled when the dampness or moisture on leaves reaches a predetermined value. The principle of the measurement and sensing utilizes the functions of the temperature-time diagrams as seen in FIG. 2, by providing a more or less rapid pulse sequence. A/D converter 23 thus provides more pulses at higher temperatures within a unit of time. As seen in FIG. 2, spores develop more rapidly as temperature increases than at lower temperature; below +5.5°C there will be no development of scaly fungus. The warning system is so constructed that the pulse sequence is more rapid when a higher temperature is sensed. At low temperature, requiring longer development periods, the repetition rate of the pulses from converter 23 and passed by NAND-gate 24 is reduced. A predetermined pulse count, therefore, corresponds in any case to a predetermined state of development of the spores of scaly fungus. If danger of fungus infection is present, a warning alarm is derived from alarm unit A, for example in form of a light signal, an audible signal, or other suitable warning output. The farmer now has a period of about 12 hours available in order to initiate a spraying program to kill developing spores by sprays. When he desires to initiate spraying, the warning system is manually disabled.

The measuring or sensing channel includes the temperature sensor 11, converter 12 and counter 13. Besides the measuring channel, sensors are provided to sense dampness or moisture of leaves, temperature, and ambient or average humidity of the ambient air. The sensors provide these data to the apparatus for processing and evaluation in a switching logic which provides the warning or alarm signal, when a certain level is exceeded. Under ordinary or rest conditions, the system is disconnected and removed from power supply, except for the logic circuit connected to sensor 10 which, since it can be all-electronic, built of integrated circuits, takes hardly any quiescent current.

The system becomes operative and starts counting only when a predetermined dampness or moisture or humidity at the leaves is sensed and, additionally, a temperature of above +5.5° C is sensed in temperature sensor 11. After the dampness of the leaves has terminated, the apparatus remains active, in dry air for 4 hours, in damp air for 12 hours; these times correspond to the life period of the developing spores. If, within this period of time, the leaf dampness or humidity again exceeds the threshold of humidity sensor 10, and the temperature is higher than +5.5°C, the count will proceed so long as the humidity and temperature conditions persist. After termination of the second cycle of humidity or dampness of the leaves, the apparatus again remains connected from 4–12 hours — depending on average humidity. If there is no further dampness on the leaves, and the count in counter 13 has not reached the critical level giving an alarm, then the apparatus is disconnected; if, however, further leaf dampness should be sensed, further counts will accumulate in counter 13 which may, depending on the counter number, lead to an alarm or not.

If, during the time of dampness of the leaves, the count number in counter 13 reaches a value which would be indicative of infection, then the count in counting relay 25 is not erased when the apparatus is turned off, but rather an alarm is given. The count of the summed pulses in counter 25 is a measure for the degree of infection, which is available as information to the farmer. The degree of infection can be determined from FIG. 2 which, however, does not show pulses but rather the time associated therewith. Curve $a$ indicates light infection, curve $b$ medium or average infection and curve $c$ a heavy infection or infestation.

If, during the pendency of response of humidity sensor 10, that is, when the leaves are sufficiently damp, the infection threshold is not reached then, when the system is disconnected, the count relay 25 will be reset to zero, or to the starting or threshold value, respectively, and to ensure ready state for a subsequent humidity cycle.

Various changes and modifications may be made within the inventive concept; the apparatus has been described in connection with an analog-digital converter to determine the composite of temperature and time during which humidity, as sensed by sensor 10 persists. Various other types of circuits may be used and the apparatus may be constructed to be entirely digital, or entirely on an analog basis. The square wave generator 14 has been shown as being controlled by an on-off type humidity sensor, which provides a signal when humidity reaches a certain threshold level; rather than using this kind of a control, generator 14 could also be proportional, by utilizing a humidity sensor which controls the repetition rate of a pulse generator of variable pulse rate, similar to analog-digital converter 23, so that the output pulses from generator 14 would vary between a value of 1.8 seconds for dry air and 5.4 seconds for very humid air, with intermediate values depending on the state of humidity of ambient atmospheric conditions.

We claim:

1. Agricultural alarm system to indicate conditions favorable to attack by agricultural pests, especially fungus infections, comprising humidity sensing means (10) sensing humidity of the atmosphere in the region of the agricultural planting and providing a humidity sensing signal;

temperature sensing means (11, 19) sensing temperature of the atmosphere in the region of the agricultural plantings and providing a temperature sensing signal;

an analog-digital (A/D) converter (23) having one of said sensing signals applied thereto and providing a digital pulse sensing signal;

threshold means (21, 22) having one of said sensing signals applied thereto;

a counter (13, 25);

and means (18, 24) connecting the other of said sensing signals and said threshold means to the counter, said counter counting the pulses of the digital sensing signal if the sensing signal exceeds the threshold level of the threshold means and the sensing signal of the other sensing means exceeds a predetermined level.

2. System according to claim 1, further comprising a timing chain including a pulse generator (14) and a timing counter (16), the timing counter having an electrical reset winding to determine the end of a counting cycle by said counter (13, 25) and the start of a new counting cycle, the timing counter being connected to said counter (13, 25).

3. System according to claim 2, wherein the pulse generator is a square wave pulse generator.

4. System according to claim 1, wherein said first signal converted into the pulsed digital sensing signal is the temperature signal, and the threshold means has the temperature signal applied thereto, so that the counter (13, 25) will count pulses representative of the composite function of temperature and time if, at the same time, a threshold level of temperature is exceeded and the humidity sensing means has provided a humidity sensing signal.

5. System according to claim 4, wherein the humidity sensing means is responsive to a predetermined value of humidity or dampness arising on leaves of the agricultural planting, and provides a signal enabling said temperature sensing means and hence said A/D converter and threshold means.

6. System according to claim 5, further comprising a timing chain including a pulse generator (14) and a timing counter (16) having the pulses from the pulse generator applied thereto, the timing counter providing output signals connected to said counter (13, 25) to reset the counter in dependence on pulses from the pulse generator;

wherein the pulse generator (14) is enabled upon sensing by the humidity sensing means that the dampness of leaves being monitored has dropped below a predetermined response level of the humidity sensing means.

7. System according to claim 6, further comprising a hygrometer (26) and providing an output signal representative of ambient humidity;

and the pulse generator provides output pulses having a repetition rate controlled by the ambient humidity signal derived from the hygrometer.

8. System according to claim 7, wherein the hygrometer includes a transfer contact and is responsive to two states of different degrees of humidity;

and the pulse generator provides two predetermined pulse repetition rates, one repetition rate being provided by the pulse generator when the hygrometer provides an output indicative of low ambient humidity, pulses of the other repetition rate being provided when the hygrometer indicates high average humidity.

9. System according to claim 6, further comprising a main switch for the system (27), the timing counter (16) being connected to control said main switch (27) to disconnect operating power to the system after a predetermined number of timing pulses are sensed by the timing counter.

10. System according to claim 9, wherein the humidity sensing means (10) is coupled to the main switch (27) to connect the system when leaf dampness in excess of a danger level of the agricultural planting is sensed.

11. System according to claim 10, further comprising a main power supply controlled by said main switch (27), said main power supply (17) comprising a transformer and a semiconductor rectifier network.

12. System according to claim 1, wherein the temperature sensor comprises a resistance bridge including a negative temperature coefficient (NTC) resistor (19); and a voltage amplifier (20) having the diagonal of the bridge network connected to its input.

13. System according to claim 1, further comprising a logic network including an analog/digital A/D converter (23) connected as a voltage-frequency converting circuit;

a threshold switch (21) and a NAND-circuit (24) passing pulses from the A/D converter if, and only if the threshold level of the threshold switch is exceeded.

14. System according to claim 1, wherein the counter comprises a summing counter having an electrical reset winding and a mechanical zero set control.

15. Agricultural alarm system to indicate conditions favorable to attack by agricultural pests, particularly fungus infections, comprising first transducer means providing a first signal representative of a first atmospheric condition above a predetermined level;

second transducer means providing a second signal representative of a second varying atmospheric condition;

and a time-signal integrator providing an output representative of the time integral of the second signal, connected to said second transducer means, and rendered active by said first signal from the first transducer means.

16. System according to claim 15, wherein said first transducer means comprises sensing means responsive to variations in atmospheric conditions and threshold means connected to and controlled by said sensing means and responding when said sensing means senses a condition above a predetermined threshold level.

17. System according to claim 15, wherein said first transducer means is responsive to leaf dampness and provides a dampness signal when the dampness exceeds a predetermined level;

said second transducer means is responsive to temperature, said output being representative of both temperature level and elapsed time when said predetermined dampness is exceeded.

18. System according to claim 15, further comprising a timing chain (14, 15, 16) providing a timing signal connected to the output of the integrator and holding the output stored for a timing duration of said timing means.

19. System according to claim 18, wherein said timing means has variable timing periods;

said first transducer means providing a signal representative of said first atmospheric condition to said timing means, to control said timing means to provide an identification of a timing cycle depending on said sensed first atmospheric condition.

20. System according to claim 18, comprising further transducer means responsive to a third ambient condition in the environment of the agricultural planting, said third transducer controlling said timing means to provide a timing signal in accordance with said sensed third condition, to provide for storing of the output of the integrator, and further totalizing of the integrator, over variable periods of time in dependence on said sensed third condition.

21. System according to claim 20, wherein said first condition is leaf dampness; said second condition is temperature; and said third condition is ambient humidity.

22. System according to claim 21, wherein said third transducer means comprises a hygrometer, and said timing means provides timing output at two different rates, one rate for low humidity and another rate for high humidity.

23. System according to claim 22, wherein the timing means has a shorter time cycle, activated when the humidity is below a predetermined level, and a longer time cycle when the humidity is above a predetermined level.

24. System according to claim 15, wherein said time-signal integrator comprises an analog/digital converter (12) connected to said second transducer means and providing an output pulse representative of the integral of the level of condition and time;

and a counter (13) is provided counting the output pulses from said A/D converter providing an output pulse when a predetermined count is reached indicative of the level of the second condition and elapsed time during occurrence of said first condition.

25. System according to claim 15, further comprising a logic network (18, 24), and a counter (13), the counter being connected to the logic network and counting the time-signal integral if a. the first transducer means provides a signal representative of a first condition above a predetermined level, and
b. the second transducer means (11, 19) provides a signal indicative of a second condition above a predetermined level,
   the counter totalizing the time-integral of the second condition and time;
   and means including a timing counter (14, 16) are provided disabling said counter means if
c. the count in the counter (13) has not reached a predetermined level during the time period set by said timing counter, but
d. permitting the counter (13) to totalize the time-condition integral during repeated cycles of activation by said first transducer means, and during the time period that said timing counter enables said counter means (13).

26. System according to claim 25, further comprising a third sensing means responsive to a third atmospheric condition dependent on said first atmospheric condition, said third transducer means controlling and starting the timing period of said timing counter whereby said timing counter is reset for a new timing period for each response of said first transducer means.

* * * * *